United States Patent [19]

Spiotta et al.

[11] Patent Number: 5,428,613
[45] Date of Patent: Jun. 27, 1995

[54] METHOD FOR TRANSMITTING EITHER DATA OR VOICE IN AN ALLOCATED TDM SLOT

[75] Inventors: Mark G. Spiotta, Wheaton; Juan C. Santiago, Elmhurst, both of Ill.

[73] Assignee: Motorola, Inc., Schaumburg, Ill.

[21] Appl. No.: 984,777

[22] Filed: Dec. 3, 1992

[51] Int. Cl.$^6$ .............................................. H04J 3/12
[52] U.S. Cl. .................... 370/85.7; 370/94.2; 370/110.1; 375/216; 375/242
[58] Field of Search ............... 370/77, 79, 85.7, 94.1, 370/110.1, 111, 112, 95.1, 94.2, 99; 375/5, 25

[56] References Cited

U.S. PATENT DOCUMENTS 5,036,513  7/1991  Greenblatt .................. 370/110.1
5,182,748  1/1993  Sakata et al. ................ 370/79

*Primary Examiner*—Benedict V. Safourek
*Attorney, Agent, or Firm*—James A. Coffing; Timothy W. Markison

[57] ABSTRACT

Data transfer for a time division multiplex (TDM) bus in a communication system that includes a plurality of communication nodes wherein each communication node is allocated at least one time slot of the TDM bus can utilize the following protocol to improve flexibility. When a communication node has an information packet to transmit, it must determine whether it is changing from a first information packet type to a second information packet type message. If a change from transmitting a first information packet type to transmitting a second information packet type is determined, an information type transition message is transmitted via the allocated time slot during a first frame cycle. Upon receiving the information type transition message, at least one other communication node stores the information type transition message. The transmitting communication node then transmits a second information packet type message during a subsequent frame cycle wherein a receiving communication node interprets the second information packet type message as a second information packet type.

5 Claims, 2 Drawing Sheets

METHOD FOR TRANSMITTING EITHER DATA OR VOICE IN AN ALLOCATED TDM SLOT

FIELD OF THE INVENTION

This invention relates generally to data transfer protocols and, in particular, to data transfer protocols utilizing a time division multiplex (TDM) bus.

BACKGROUND OF THE INVENTION

Communication systems are known to comprise a plurality of communication nodes that are coupled together via a TDM bus. A communication node may be a portable radio or mobile radio coupled to a fixed end via a wireless TDM bus. The communication node may also be components within the fixed end coupled together via a wireline TDM bus. For example, these communication nodes may be base interface modules, a controller, operator mux interface, etc.

As is known, the TDM bus comprises a plurality of successive frames, wherein each frame is time divided into a predetermined number of time slots. Typically, the first time slot is used for frame synchronization, and the last slot in the frame is dedicated to data transmission. The remaining slots are used for carrying digitized audio. Of the slots that are carrying audio, each is assigned to a communication node. Once the assignments are made and the frame pattern determined, the frame pattern remains fixed, i.e., slots carrying audio only carry audio, slots carrying data only carry data, etc.

While fixed frame patterns work well in most instances, the system may become bogged down when several communication nodes have data to transmit. As is known, each communication node transmits its data to the system via the data time slot. Once a communication node has access to the data time slot, it does not relinquish the time slot until it transmits all its data. Thus, many communication nodes could experience a significant delay before it transmits its data. However, the fixed pattern of the TDM was necessary to allow the other nodes to know when audio was being transmitted and when data was being transmitted.

Therefore, a need exists for a data transfer protocol that allows any slot within a time division multiplex bus to carry both digitized audio and data.

DESCRIPTION OF A PREFERRED EMBODIMENT

Generally, this invention provides a means and a method for transferring data or digitized analog information between communication nodes via an allocated time slot of a time division multiplex (TDM) bus. This is achieved by allowing each time slot of the TDM bus to operate in two distinct modes, a pulse coded modulation (PCM) mode or a data mode. For instance, when a communication node needs to transmit an information packet which is of the digitized analog type and the previous information packet transmitted was of the same type, the communication node merely transmits the information packet during its allocated time slot. When a communication node needs to transmit an information packet which is different from its previously transmitted information packet type, i.e., the communication node previously transmitted a digitized analog information packet and now it needs to transmit a data information packet type, it must first transmit an information type transition message during its allocated time slot. The information type transition message consists of transmitting a predetermined set of bits in a time slot. After the information type transition message has been transmitted to and stored by each of the other communication nodes, the transmitting communication node can transmit information packets of the data type. If the communication node needs to transmit digitized analog information again, it transmits another information packet type transition message during its allocated time slot. After which it will transmit digitized analog information packets.

Figure 2:
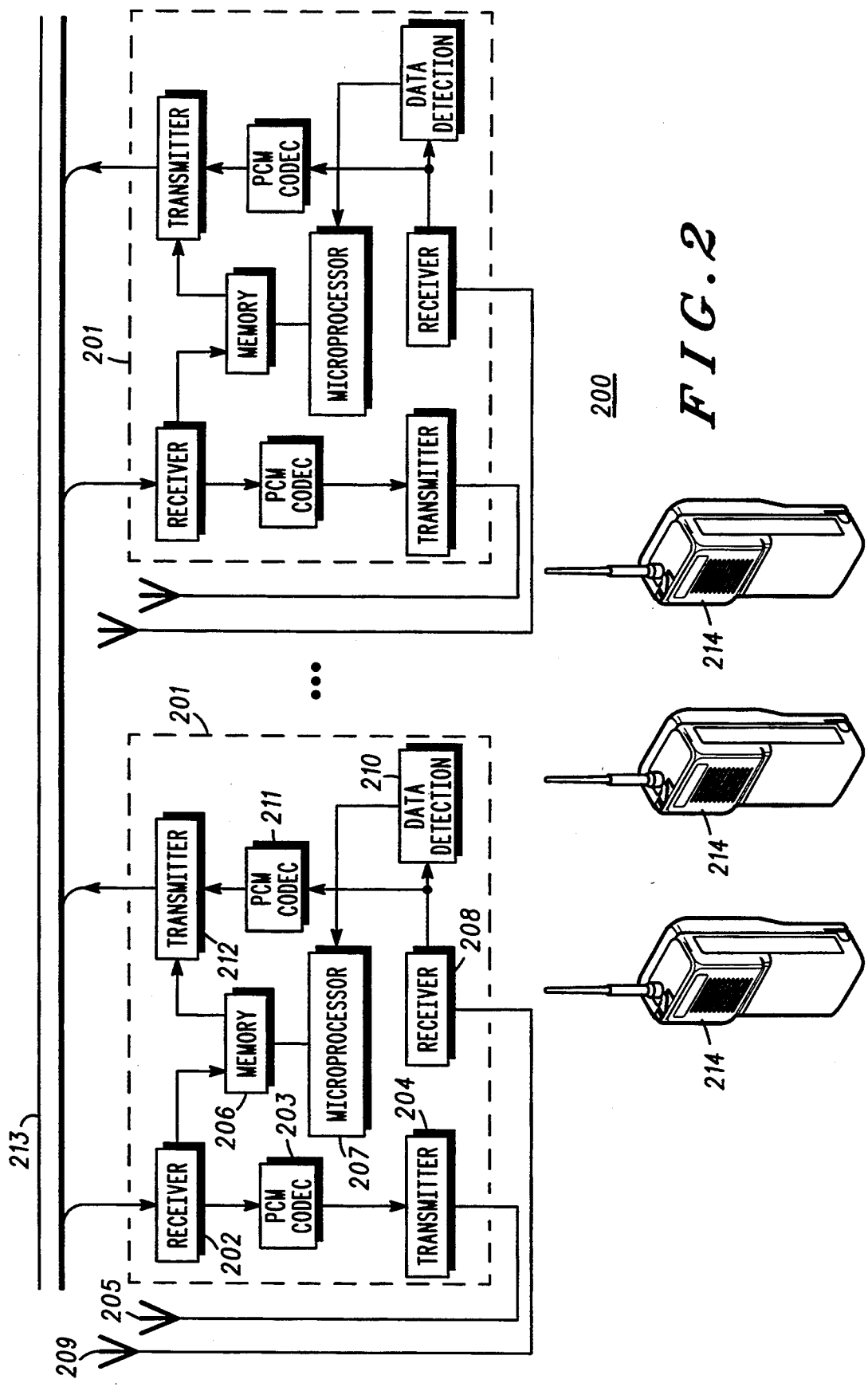
FIG. 2 illustrates a system overview in accordance with the present invention.

The present invention can be more fully described with reference to FIGS. 2 and 3. FIG. 2 illustrates a communication system 200 that includes a plurality of communication nodes 201, (only 2 shown), linked via a TDM bus 213 and communication units 214. Each of the communication nodes comprises a TDM bus receiver 202, a PCM Codec 203, a radio frequency (RF) transmitter 204, an antenna 205, a memory device 206, a microprocessor 207, an RF receiver 208, an antenna 209, a data detection device 210, a PCM Codec 211, and a TDM bus transmitter 212. The PCM Codec generates the digitized audio information, the data detection device generates the data, and the microprocessor generates the transition message. These functions and operation of these elements are known, thus no further description will be presented except to facilitate the understanding of the present invention.

This invention allows either audio or data to be transferred via the TDM bus in any allocated time slot. Before a transmitting communication node transmits an information packet, it must determine whether it is changing from transmitting one type of information packet to another type of information packet. For instance, if the communication node previously transmitted a data information type packet and it now needs to transmit a digitized analog information type packet or if the communication node previously transmitted a digitized analog information type packet and it now needs to transmit a data information type packet.

If the communication node is changing from transmitting one type of information packet to another type of information packet, the transmitting communication node must inform the receiving communication node of an information type change transition. This is achieved by the transmitting communication node transmitting an information type transition message. The information type transition message consists of a predetermined set of bits transmitted during the transmitting communication node's allocated time slot. When the receiving communication node receives the information type transition message, it internally stores away the type transition for later use by an interpreter which is contained in the microprocessor. For instance, if the transmitting communication node previously transmitted a data information packet type and now needs to transmit a digitized analog information packet type, the transmitting communication node would transmit an information type transition message. The receiving communication node would receive the information type transition message and internally store the type transition such that the interpreter interprets subsequent information packets received from the transmitting communication node as being digitized analog information packets. Likewise, if the transmitting communication node previously transmitted a digitized analog information packet type and now needs to transmit a data information packet type, the transmitting communication node would transmit an information type transition message. The receiving communication node would receive the information type transition message and internally store the type transition such that the interpreter interprets subsequent information packets received from the transmitting communication node as being data information packets.

Once the transmitting communication node has determined whether it will transmit the same type of information packet as it previously transmitted, or it is changing from transmitting one type of information packet to another type of information packet and it has transmitted an information type transition message, it can now transmit information packets during its allocated time slot and have the receiving communication node interpret the information packet properly.

When a communication node is transmitting digitized analog information in the PCM mode of operation, an 8 bit digitized analog sample is transferred on the bus via the TDM transmitter 212, every 125 us if utilizing an 8 kHz frame rate. Each communication node listening to the bus accepts the full 8 bit byte via its TDM receiver 202 every frame cycle. Through the interpreter, the information packet is determined to be either digitized analog information or an information type transition message. The interpreter determines this by the type transition which was previously stored from the last transition type message received. If the interpreter interprets the received information packet as a digitized analog information packet, the digitized analog information packet is changed from digitized analog information back to analog information by the PCM Codec 203 and then routed to the RF transmitter 204 for transmission out the antenna 205. If the interpreter interprets the information packet as an information type transition message, the type transition is stored in memory 206 for later use by the microprocessor 207.

In the data mode of operation, non-PCM data, synchronous or asynchronous, burst or continuous, can be transferred over the same physical bus if the data rate is less than or equal to 32 kbps, (if utilizing only 4 bits per time slot for valid data), for an 8 kHz frame rate, (56 kbps if utilizing 7 bits per time slot for valid data). Each communication node listening to the bus accepts the full 8 bit byte via its TDM receiver 202 every frame cycle. Through the interpreter, the information packet is determined to be either data information or an information type transition message. The interpreter determines this by the type transition which was previously stored from the last transition type message received. If the interpreter interprets the received information packet as a data information packet, the data is stored in memory 206 for use later by the microprocessor 207. If the interpreter interprets the information packet as an information type transition message, the type transition is stored in memory 206 for later use by the interpreter.

Although 8 bits of data are transferred between communication nodes every frame cycle when in the data mode of operation, the transmitting communication node may not have data each frame cycle. A means of indicating that valid data is present in a time slot is therefore required. For example, the most significant bit (MSB) in the 8 bit byte may be used as a flag to indicate that valid data is present in the received lower nibble of the TDM allocated time slot byte. When the transmitting communication node has a data information packet type to send, it transfers the data information 4 bits at a time, by placing the four valid data bits in the lower nibble of the TDM allocated time slot byte. The MSB is set to '1' to indicate that valid data is present in the lower nibble of the TDM allocated time slot byte. When the transmitting communication node has no data information packet type to transfer, it clears the MSB of the outbound TDM allocated time slot.

When a communication node receives an 8 bit data information packet, the MSB is tested to determine if valid data is present in the lower nibble. When the MSB is clear, indicating invalid data present, the remainder of the byte is ignored. When the MSB is set, the upper nibble is stripped off and the lower nibble is accepted for processing.

Figure 3A:
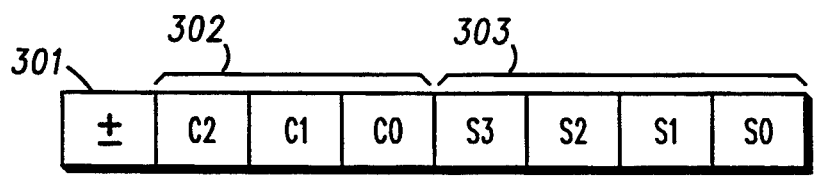
FIGS. 3A–3C illustrate time slot formats in accordance with the present invention.
Figure 3B:
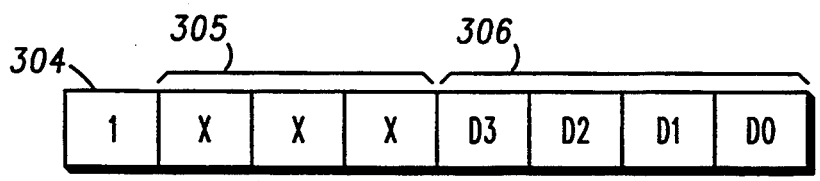
Figure 3C:
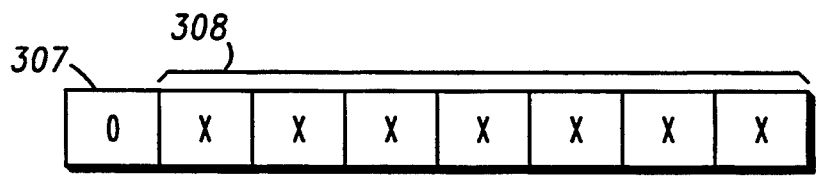

FIGS. 3A-3C illustrate time slot formats in accordance with the present invention. FIG. 3A depicts a PCM audio information type packet format that includes a bit to indicate the sign 301, 3 bits of chord information 302 and 4 bits of step information 303. FIG. 3B depicts a valid data information packet type format that includes 1 bit 304 whose value is '1' to indicate valid data present in the data information packet, 4 bits of data information 306, and 3 bits of don't care information 305. FIG. 3C depicts an invalid data information packet type format that includes 1 bit whose value is '0' to indicate invalid data present in the data information packet 307 and 7 bits of don't care data information 308.

Since PCM audio occupies the full 64 kbps bandwidth of a standard PCM highway time slot, the information type transition must be sent via another means or method. This can be achieved by indicating transmitting mode changes by: 1) utilizing unused bits or time slots on the PCM highway to allocate one mode bit per time slot capable of supporting both PCM audio and data, 2) defining an invalid PCM sample state, such as $00 for Mu-Law companding, as a control character to indicate a bus mode change. The control character could also be followed by another mode indication byte to provide positive mode control.

Figure 1:
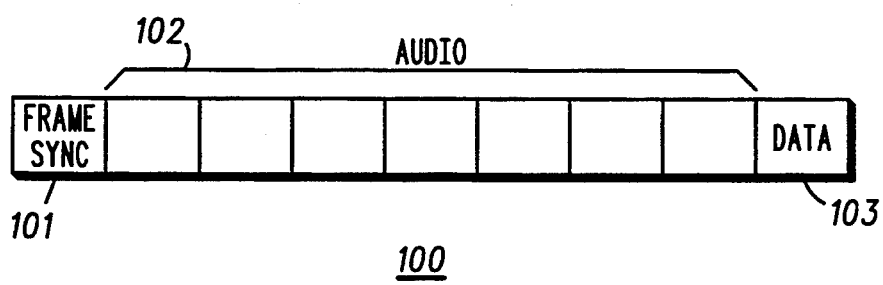
FIG. 1 illustrates a time slot format of a typical prior art TDM frame.

In comparison with FIG. 1, which illustrates a time slot format for the prior art 100 that includes a frame synchronization time slot 101, followed by several time slots for PCM audio information 102, followed by a time slot for data information 103, the present invention allows for different types of information to be transmitted during an allocated time slot, i.e., either data or digitized analog information. In the prior art, each time slot assigned to a communication node is designated to carry only digitized analog information, except for the last time slot which is utilized by all the communication nodes for sending data information. The present invention adds the flexibility of allowing a communication node to send data whenever needed during its allocated time slot rather than having to wait to gain access to the common data time slot as was required in the prior art.

We claim:

1. In a communication system that includes a plurality of communication nodes and a time division multiplex (TDM) bus, wherein each of the communication nodes is allocated at least one time slot of the TDM bus to produce an allocated time slot, a method for a communication node to transmit either data or digitized analog information in the allocated time slot, the method comprises the steps of:

a) determining, by the communication node, whether to change from transmitting a first information packet type to transmitting a second information packet type, wherein the first information packet type is either data or digitized analog information and the second information packet type is the exclusive opposite of the first information packet type;

b) transmitting, by the communication node via the allocated time slot, an information type transition message during a first frame cycle;

c) upon receiving the information type transition message, storing, by at least one other communication node, the information type transition message for the communication node; and d) transmitting, by the communication node, a second information packet type message during at least one subsequent frame cycle, wherein at least one other communication node interprets the second information packet type message as a second information packet type.

2. The method of claim 1 further comprises transmitting, by the communication node, a second information type transition message that indicates that during subsequent frame cycles, the communication node will be transmitting first information type packets.

3. The method of claim 2 further comprises:

upon receiving the second information type transition message, storing, by at least one other communication node, the information type transition message for the communication node; and transmitting, by the communication node, a first information packet type message, wherein at least one other communication node interprets the first information packet type message as a first information packet type.

4. In the method of claim 1, wherein the second information type packet is data, step (d) further comprises setting a predetermined number of bits within the allocated time slot to indicate whether a data message contained within the allocated time slot is valid.

5. In a communication system that includes a plurality of communication nodes and a time division multiplex (TDM) bus, wherein each of the communication nodes is allocated at least one time slot of the TDM bus to produce an allocated time slot, and wherein each of the plurality of communication nodes is improved to comprise:

generating means for generating an information type transition message, wherein the information type transition message indicates that the information transmitted in the allocated time slot will be changed from a first information packet type to a second information packet type and wherein the first information packet type is either data or digitized analog information and the second information packet type is the exclusive opposite of the first information packet type;

storage means for storing information type transition messages produced by other communication nodes; and interpretation means, operably coupled to the storage means, for interpreting whether a first information packet type message or a second information packet type message is contained within other communication nodes allocated time slots based on the information type transition message.

* * * * *